3,117,271
TRANSISTOR-CONTROLLED POWER SUPPLY
WITH OVERLOAD PROTECTION
Frederik Arend Gerhardus Timmermans, Rotterdam, and Willem Adrianus Johannes van Jaarsvelt, Delft, Netherlands, assignors to Nederlandse Organisatie voor Toegepast-Natuurwetenschappelijk Onderzoek ten behoeve van Nijverheid, Handel en Verkeer, The Hague, Netherlands, a corporation of the Netherlands
Filed Jan. 30, 1961, Ser. No. 85,911
1 Claim. (Cl. 321—14)

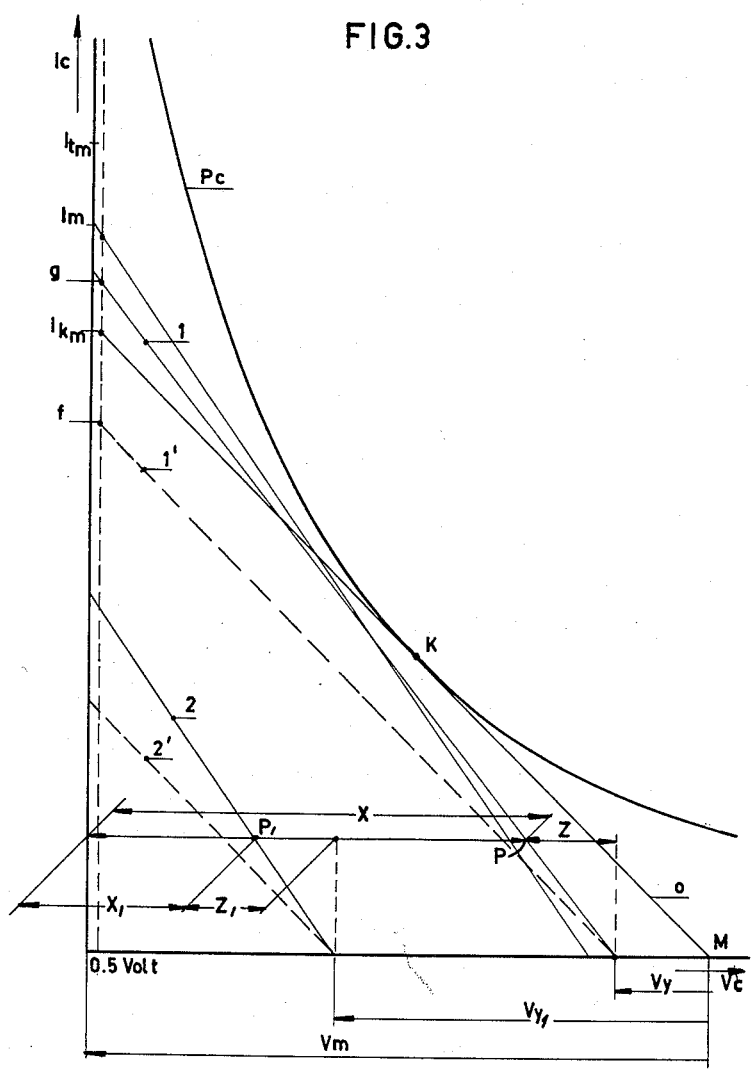

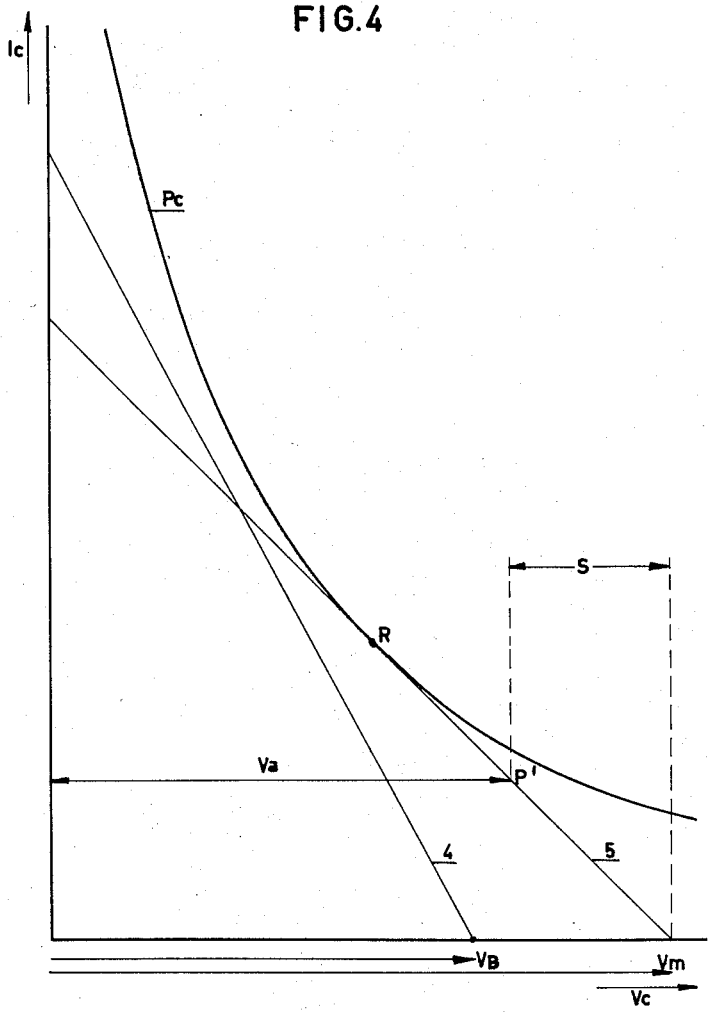

The invention relates to a controlled power supply comprising a rectifier circuit having an input circuit and an output circuit, and provided with a transistor as controlling element in its output circuit, said transistor being controlled in dependence on the potential difference between a reference voltage and the voltage across the load, and provided with protecting means against overloading disposed before the rectifier.

Such a controlled power supply is known from American patent specification No. 2,832,034.

In this apparatus the control transistor is connected in series with the load in the output circuit of the apparatus.

A drawback of this controlled power supply may present itself in the fact that, under certain loading conditions, for instance, when the voltage across the load is low, the dissipation in the control transistor is very high.

Thus, at short-circuit of the output circuit of the controlled power supply, practically the whole of the power of the rectifier is dissipated in the control transistor, which may cause the latter to be damaged.

Many means are known for precluding these loading conditions which are so detrimental to the control transistor.

Among other things, these known protecting means consist of the application of fuses, switches operating with a bimetal, or relays in the rectifier or load circuits, and in these the drawback often makes itself felt that they discontinuously influence the load circuit.

If, for instance, a highly capacitive load is connected to a similarly protected controlled power supply—whereby at first it is substantially the short-circuit current that flows—then the protection comes into operation and the voltage across the load drops out.

It is also possible, when a plurality of controlled power supplies are working parallel to each other, for an occasional unequal distribution of the total current over the controlled power supplies to cause an overloading of one of the controlled power supplies.

The result hereof is that the voltage across the load drops out again, because the rest of the controlled power supplies are also overloaded and their protections come into operation one after the other.

In another known controlled power supply the control transistor is connected in parallel to the load.

When in this known supply the load drops out, it is possible for the control transistor to get overloaded, because in that case it is the control transistor alone that forms the load of the supply, because there is a high voltage across the control transistor, and because the control transistor is directed towards a low internal resistance.

If to this supply a highly capacitive load is connected, the control transistor may be overloaded, when the current through the load circuit has become small in consequence of the charging of the condensers.

The object of the invention is to provide the controlled power supply with a protection against an exceeding of the maximally allowable dissipation within the control transistor.

Another object of the invention is to provide a controlled power supply continuously protected and controlled over the entire range of load, which at short circuit will supply the current belonging to said state.

To this end the controlled power supply according to the invention is provided with a protection comprising a controllable variable impedance, which increases as the dissipation within the transistor increases, in such a way that the maximally allowable dissipation in the transistor cannot be exceeded.

Preferably, when the transistor is connected in series with the load in the output circuit of said power supply, the variable impedance is controlled by the voltage across the load and the impedance increases as the voltage across the load decreases.

In one particular embodiment the impedance comprises a winding connected in series with the rectifier, said winding being provided on the middle leg of a three-legged core, an additional winding being provided on each of the outer legs of said core, which additional windings are connected in series, this latter series connection being connected in parallel to the load of the supply.

When the voltage across the load is high, a large direct current flows through the additional windings connected in series situated on the outer legs of the three-legged core, whereby all the parts of the core, except the middle leg, are highly magnetized and the impedance is low.

At short circuit of the controlled power supply no direct current flows through the series-connected windings, the impedance then having its maximal value.

At short-circuit the internal resistance of the rectifier and the maximal impedance make out the total load of the control transistor.

This total load is chosen in such a way that the allowable dissipation in the transistor is not exceeded.

At short-circuit a current flows, which is a function of the total load and the resistance of the transistor.

After the elimination of the short-circuit the output voltage is present again without any delay.

The protection is completely fool-proof. A parallel operation of two or more controlled power supplies in the same load is simply possible, because in the event of an unequal distribution of the total current occurring, this fact can never cause too high a dissipation in any of the controlled power supplies. An advantage of the controlled power supply is that a large current can be drawn when there is a high voltage across the load because the impedance is low.

In the case of a control transistor having a resistance which is directed to a very small value, it is particularly important that the impedance should be low, because hereby a large current is allowed to flow through the load circuit, whilst across the transistor a sufficient voltage is left to make controlling possible.

In another preferred embodiment, when the transistor is connected in parallel to the load in the ouput circuit of the power supply, the variable impedance is controlled by the current through the load and the impedance increases as the current through the load decreases.

In one particular embodiment the impedance comprises a winding connected in series with the rectifier, said winding being provided on the middle leg of a three-legged core and an additional winding being provided on each outer leg of said core, said additional windings being connected in series and said latter series connection being connected in series with the load of the supply.

Through the series-connected additional windings on the outer legs of the three-legged core a small direct current flows when the voltage across the load is high, the impedance then having a high value.

The impedance reaches its maximal value, when the current through the load drops out, in which case the internal resistance of the rectifier and the maximal impedance make out the total load of the transistor.

This total load is chosen in such a manner that the allowable dissipation in the transistor is not exceeded.

The invention will now be further illustrated with the aid of the accompanying drawing, in which:

FIG. 3 is a graph, with the aid of which the operation of the embodiment shown in FIG. 1 will be illustrated.

FIG. 4 is a graph serving to illustrate the embodiment shown in FIG. 2.

In these figures like reference numerals and letters refer to corresponding elements.

Figure 1:
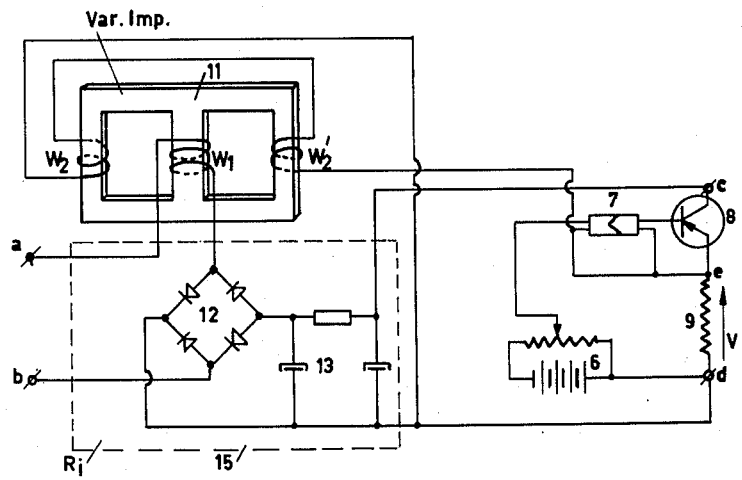
FIG. 1 shows a schematical view of an embodiment of a controlled power supply, in which the control transistor is connected in series with the load in the output of the supply.

In FIG. 1 the terminals $a$ and $b$ are connected to an alternating current source, for instance to an alternating voltage mains or to a transformer connected with such a mains.

The winding $W_1$ is wound on the middle leg of the three-legged core 11 of the variable impedance, and on the outer legs are wound the windings $W_2$ and $W'_2$, the latter two windings being connected in series, both having the same number of windings oppositely wound.

To the terminals $a$ and $b$ is connected the rectifier 12 in series with the winding $W_1$.

Neither the rectifier 12 nor the ripple filter 13 will be discussed in detail, both circuits are of the conventional type and may, if desired, be replaced by diverse other circuits.

The load 9 being in series with the control transistor 8 is connected to the terminals $c$ and $d$ of the rectifier circuit 15.

The series-connected windings $W_2$ and $W'_2$ are connected in parallel to the load 9. The voltage V across the load 9 is compared with the reference voltage 6 and the potential difference, if desirable amplified by an amplifier 7, directs the control transistor 8 in such a manner that the potential difference becomes smaller and the voltage V across the load 9 eventually becomes practically equal to the reference voltage 6. The reference voltage 6 may proceed from any voltage-delivering element, for instance from a Zener diode or from an amplified thermocouple voltage. The whole forms a closed control loop. In the controlled power supply the variable impedance Var. Imp. only serves as protective element and in particular as protection for the control transistor 8.

The impedance Var. Imp. is controlled by the voltage V of the load 9 of the power supply in such a manner that this impedance Var. Imp. is high when the voltage V across the load 9 is low, so high that the current Ic through and the voltage Vc across the transistor 8 (that is: the power dissipated in the transistor) do not exceed a determined allowable value, and that said impedance Var. Imp. is low when the voltage V across the load 9 is high.

When the voltage V across the load 9 is high, a large current can be drawn from the power supply, as a result of the occurrence of said low impedance and of the low internal resistance Ri of the rectifier apparatus 15, so that the voltage across the control transistor 8 does not sink below a determined limit value and the transistor 8 remains controlling.

No more, on the other hand, is an exceeding of the dissipation in the transistor 8 allowed when the voltage V across the load 9 is low and the current Ic through the load 9 is high, and, therefore, the impedance Var. Imp. together with the internal resistance Ri of the rectifier apparatus 15 should then have a value that is such that the allowable dissipation of the transistor cannot be exceeded.

At a short-circuit of the terminals $e$ and $d$ of the power supply the impedance Var. Imp. reaches its maximum value.

At a determined value of the reference voltage 6 a short circuit current may flow such as to cause the maximum allowable dissipation to occur in the transistor.

The maximum allowable dissipation in the transistor 8 cannot be exceeded if the maximum impedance value is correctly chosen.

The maximum current through the short-circuit is $Ikm$. At this current, the voltage across the impedance Var. Imp. is maximum, and it is this voltage that, together with the voltage across the internal resistance Ri of the rectifier apparatus 15, alone constitutes the load of the power supply, because in that case there is practically no voltage across the control transistor 8.

The above will be further elucidated with the aid of FIG. 3.

In this figure Pc is a dissipation curve drawn for a determined combination of transistor 8, cooling surface and maximal surrounding temperature.

In the figure the collector voltage Vc is set out on the horizontal axis and the collector current Ic of the control transistor 8 on the vertical axis.

$Vm$ is the maximal voltage delivered by the rectifier 12, that is the voltage at zero load.

The lowest voltage across the control transistor 8 at which said transistor 8 will still control is about 0.5 volt.

In the figure, a dotted line has been drawn through this voltage across the horizontal axis, and parallel to the vertical axis.

The tangent $o$ from the point M on the horizontal axis to the curve Pc is a working line of the transistor 8 which corresponds to short-circuited terminals $e$ and $d$ of the power supply.

For any point on this line $o$ the distance to the vertical axis is a measure for the voltage across the control transistor 8.

It is only in the tangent point K that the dissipation in the transistor can reach its maximally allowable value.

In order to achieve this, a resistance corresponding to said tangent $o$ should be present in the current circuit of the transistor 8.

Said resistance is formed by the sum of the internal resistance Ri of the rectifier circuit 15 and the maximal impedance value of the variable impedance Var. Imp.

To the voltage Vy across the load 9 corresponds the load line 1 and to the voltage $Vy_1$ corresponds the load line 2.

The distance $x$ from any working point P of the transistor 8 on the line 1 to the vertical axis represents the voltage across the transistor 8 at a voltage Vy across the load 9.

The distance $z$ is equal to the sum of the voltage VRi across the internal resistance Ri of the rectifier apparatus 15 and the voltage Vimp. across the variable impedance Var. Imp.

The distance $x_1$ from the point $P_1$ on the line 2 to the vertical axis represents the voltage across the transistor 8 at a voltage $Vy_1$ across the load 9.

The distance $z_1$ again is equal to the above-mentioned sum of voltages and is smaller than $z$ in connection with the smaller value the variable impedance Var. Imp. belonging to the higher voltage V across the load 9.

If the impedance value should be constant, then the lines 1 and 2 would have to run parallel to the tangent through M, like the lines 1' and 2'.

When the controlled voltage across the load 9 is Vy and the working line for the transistor is 1', the maximal current to be drawn from the power supply is $f$ amperes.

Above this current intensity the voltage across the transistor 8 drops below 0.5 volt and the transistor 8 then does not control any longer.

Because the working line 1', in consequence of the impedance being controlled has been replaced by the line 1, a current $g$ can be drawn from the controlled power supply at the same voltage $V_y$ across the load.

Besides by the dissipation, the use of the transistor is also limited by a maximally allowable current $I_{tm}$ going through it.

As stated above, the maximal current occurring at short-circuit is the current $I_{km}$.

When the value of the voltage $V$ across the load 9 differs from zero, currents $g$ may occur which are larger than $I_{km}$.

The largest occurring current is $I_m$. This value $I_m$ is determined by dimensioning the value of the variable impedance Var. Imp. in combination with the internal resistance $R_i$ of the rectifier circuit 15 in dependence on the voltage $V$ across the load 9.

Because of the before-mentioned current limitation of the transistor 8, this $I_m$ should be smaller than or equal to $I_{tm}$, or, if so desired, $I_m$ and $I_{km}$ can be made equal to $I_{tm}$.

The rectifier of the power supply is constructed in such a way as to be able to deliver this $I_m$ without any risk being incurred.

Therefore, at a determined voltage $V$ across the load 9 a maximal current can occur which is smaller than or at most equal to $I_m$.

If at this voltage it is tried to draw a still larger current from the power supply then the voltage across the load 9 will fall, because the transistor 8 is no longer able to control and the variable impedance increases.

In the extreme case of short-circuit the current $I_{km}$ arises.

The power supply is completely proof against short-circuit although at a high voltage across the load 9 a high current can be drawn from the power supply, as a result of the low internal resistance combined with the high output voltage.

Therefore, the function of the variable impedance Var. Imp. is in the first place a protection against over-dissipation for the transistor 8 and in the second place a protection for the composing parts of the rectifier apparatus.

The function of the transistor is the stabilization of the voltage across the load 9.

Figure 2:
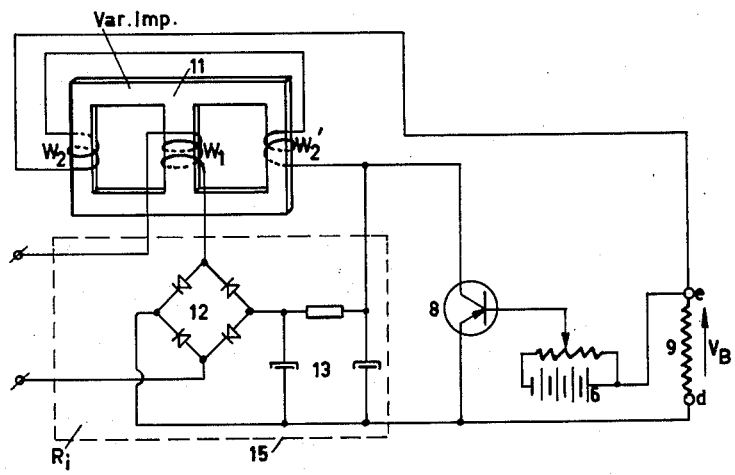
FIG. 2 shows a schematical view of an embodiment of a controlled power supply, in which the control transistor is connected in parallel with the load in the output of said supply.

In FIGURE 2 the control transistor 8 is connected in parallel to the load 9.

When the load 9 drops out, the control transistor 8 may get overloaded, because the transistor 8 is directed towards a large current whilst at the same time the full voltage of the power supply is present across the transistor.

By the provision of the variable impedance Var. Imp. in the circuit the transistor 8 and with it the entire power supply is protected.

The above will be further elucidated with the aid of FIGURE 4.

Here again, $P_c$ is the dissipation curve of the transistor 8, $I_c$ is the collector current and $V_c$ is the collector voltage. $V_m$ again is the maximum voltage which the rectifier 12 can deliver.

The tangent 5 from the point $V_m$ on the horizontal axis to the curve $P_c$ now is a working line of the transistor 8 corresponding to the zero load, that is to say, if the terminals $e$ and $d$ are not loaded.

For any point $P'$ of this line 5 the distance to the vertical axis is a measure for the voltage $V_a$ across the control transistor 8.

At the point R the maximum allowable dissipation in the transistor 8 occurs.

The distance S is a measure for the voltage across the variable impedance Var. Imp., which for zero load assumes its maximum value, and the internal resistance $R_i$ of the rectifier circuit 15.

The working line 4 for the transistor 8 corresponds to a voltage $V_B$ across the load 9.

The working line 4 is steeper than the line 5, because for this loading condition the variable impedance Var. Imp. assumes a lower value than it does for zero load as a result of the current through the load 9.

At a short-circuit of the terminals $e$ and $d$, the short-circuit current runs through the load 9 which current the rectifier of a short-circuit proof power supply must be able to deliver.

The transistor 8 is completely protected by the controllable variable impedance Var. Imp. which is adjusted to the dissipation curve $P_c$ of the transistor 8.

We claim:

A controlled power supply comprising a rectifier circuit having an input circuit and an output circuit, a load circuit and a control circuit connected to said output circuit, said control circuit including a control transistor and a reference voltage source, said control transistor being connected in series with said load circuit and being controlled in accordance with the potential difference between the reference voltage and the voltage across the load, and overload protection means coupled in said input circuit of the rectifier circuit, said protection means including an inductance connected in series with the rectifier, said overload protection means further including a three-legged core, said inductance being wound on the center leg of said core and a pair of windings each wound on one of the outer legs of said core, said pair of windings being connected in series opposition with each other and being connected in parallel with the load.

References Cited in the file of this patent

UNITED STATES PATENTS 2,903,640    Bixby _____ Sept. 8, 1959

FOREIGN PATENTS 1,179,359    France _____ Dec. 22, 1958